United States Patent [19]

Peterson et al.

[11] Patent Number: 5,391,533
[45] Date of Patent: Feb. 21, 1995

[54] CATALYST SYSTEM FOR PRODUCING CHLORINE DIOXIDE

[75] Inventors: Thomas H. Peterson, Rochester; James V. Griepenburg, Pittsford, both of N.Y.; Kevin F. Keating, Austin, Tex.

[73] Assignee: AMTX, Inc., Canandaigua, N.Y.

[21] Appl. No.: 19,868

[22] Filed: Feb. 19, 1993

[51] Int. Cl.$^6$ .................. B01J 21/04; B01J 21/12; B01J 23/44; B01J 37/08

[52] U.S. Cl. .................. 502/262; 502/258; 502/185; 502/174; 502/217; 502/439; 502/250

[58] Field of Search ............ 502/185, 174, 217, 159, 502/173, 303, 304, 261, 262, 332, 333, 334, 339, 328, 439, 527, 258, 250; 423/477; 425/405.1

[56] References Cited

U.S. PATENT DOCUMENTS

| | | | |
|---|---|---|---|
| 4,021,373 | 5/1977 | Kane | 502/316 |
| 4,154,810 | 5/1979 | Isa et al. | 423/478 |
| 4,362,707 | 12/1982 | Hardee et al. | 423/478 |
| 4,381,290 | 4/1983 | Hardee et al. | 423/478 |
| 4,448,833 | 5/1984 | Yamaguchi et al. | 502/527 X |
| 4,568,572 | 2/1986 | Lee et al. | 427/376.2 |
| 4,631,268 | 12/1986 | Lachman et al. | 502/439 |
| 4,637,995 | 1/1987 | DeAngelis et al. | 502/439 |
| 4,853,170 | 8/1989 | Bühler et al. | 425/405.1 X |
| 4,997,626 | 3/1991 | Dziabo et al. | 422/37 |
| 5,008,096 | 4/1991 | Ringo | 423/477 |
| 5,078,908 | 1/1992 | Ripley et al. | 252/187.21 |
| 5,084,149 | 1/1992 | Kaczur et al. | 423/477 X |
| 5,135,623 | 8/1992 | Dziabo et al. | 204/101 |
| 5,266,548 | 11/1993 | Koradia et al. | 502/439 |

FOREIGN PATENT DOCUMENTS

| | | |
|---|---|---|
| 0445200A1 | 9/1991 | European Pat. Off. |
| 61-209045 | 9/1986 | Japan . |
| 62-266142 | 11/1987 | Japan . |
| 2-237643 | 9/1990 | Japan . |

OTHER PUBLICATIONS

*Chemical Dictionary*, Grant et al. ed., 5th ed., McGraw-Hill Book Co., 1987.

*Primary Examiner*—Linda Skaling
*Assistant Examiner*—Douglas J. McGinty
*Attorney, Agent, or Firm*—Oliff & Berridge

[57] ABSTRACT

A catalyst contains at least one Group VIII metal and/or Group VIII metal oxide deposited on internal surfaces of a support which contains a sintered agglomerate substrate which is preferably coated with a hydrated metal oxide.

33 Claims, 1 Drawing Sheet

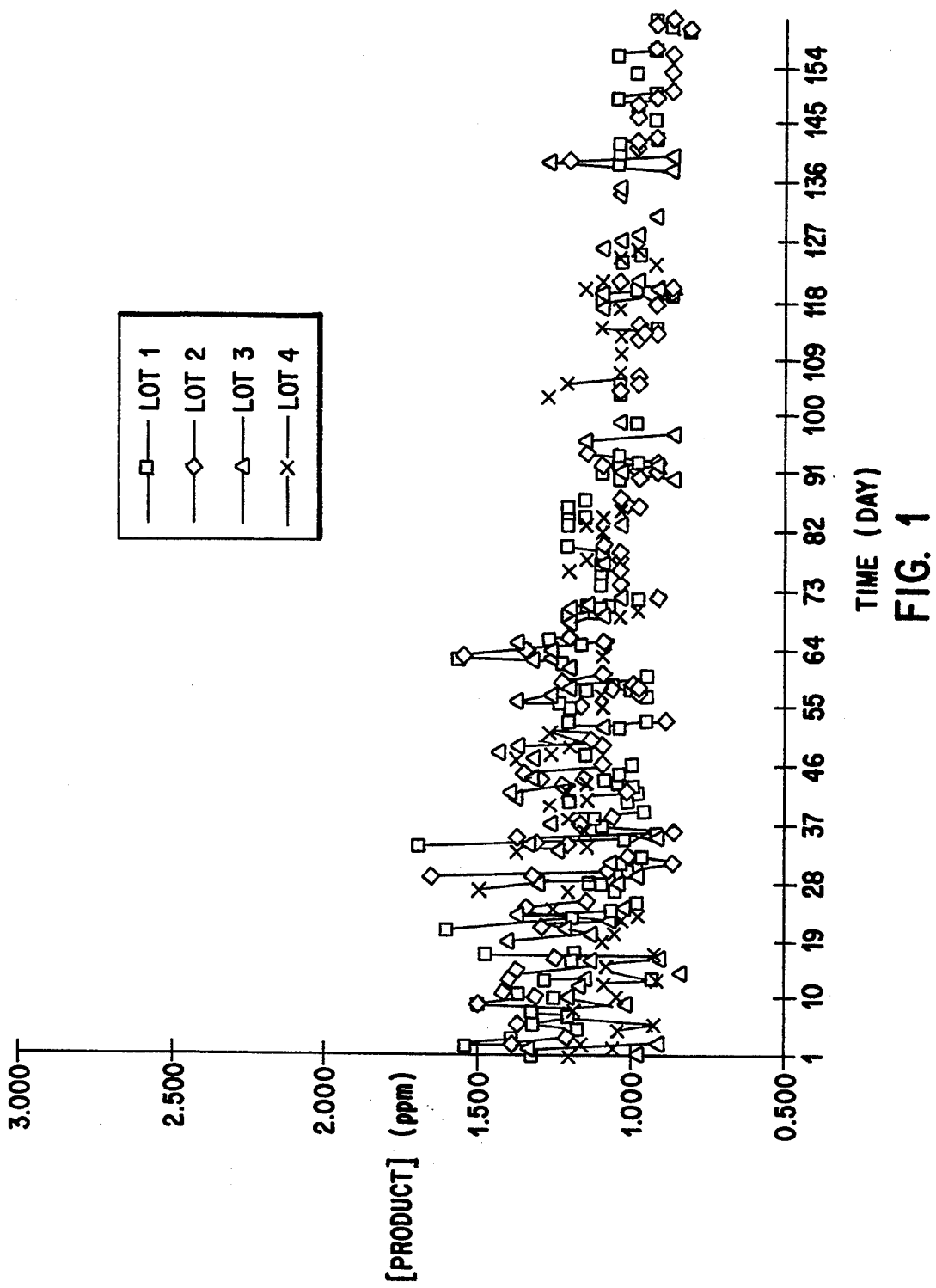

CATALYST SYSTEM FOR PRODUCING CHLORINE DIOXIDE

FIELD OF THE INVENTION

The present invention is directed to a catalyst system which is especially useful in generating chlorine dioxide.

Background

Chlorine dioxide is a very desirable product which has diverse applications. For example, chlorine dioxide is known to act as a disinfecting or sterilizing agent for solutions and devices, such as for purification and treatment of water, especially drinking water, and for disinfecting and sterilizing contact lenses. See, for example, U.S. Pat. No. 4,997,626 to Dziabo et al.

The catalyst enhanced generation of chlorine dioxide, and particularly the transition metal or transition metal oxide enhanced generation of chlorine dioxide, is known in the art. For example, U.S. Pat. No. 5,008,096 to Ringo discloses generating chlorine dioxide from an aqueous medium using as a catalyst a transition metal, a transition metal oxide or mixtures thereof. Similarly, U.S. Pat. No. 5,078,908 to Ripley et al. discloses generating chlorine dioxide from a stable precursor using a transition metal catalyst. See also U.S. Pat. No. 4,154,801 to Isa et al. U.S. Pat. Nos. 4,381,290 and 4,362,707, both to Hardee et al., disclose the catalytic generation of chlorine dioxide using a mixture of one or more platinum group oxides.

However, while such catalysts are known, the reaction environments to which they are generally exposed chemically and thermally reduce their performance over time. Thus, the chemical activation level and conversion efficiency of these catalysts decreases over time.

Other methods used to generate chlorine dioxide are also known. For example, U.S. Pat. No. 5,135,623 to Dziabo discloses passing an electric current through an aqueous solution containing a chlorine dioxide precursor. European Patent Application 445,300 discloses a similar method. This application discloses a method for cleaning and disinfecting contact lenses by immersing the lenses in the solution and supplying a direct current to generate chlorine dioxide. The drawbacks of these systems are manifest. Such systems are cumbersome and require either batteries or direct electrical current, increasing their cost and decreasing their portability. Further, the electrical current produced may generate chlorine radicals which could damage the contact lens.

Also known are transition metal catalysts used for waste gas purification. For example, Japanese Patent 2-237643 discloses a catalyst, comprising a mixed oxide of a lanthanide metal and palladium ($Ln_2PdO_4$) and platinum and rhodium deposited on a cerium containing alumina coating. Japanese Patent 62-266142 discloses a catalyst comprising cerium and palladium complex oxides on alumina substrates. In this disclosure, the palladium is deposited on the support after cerium oxide has been fused to the support. Japanese Patent 61-209045 discloses a catalyst comprising lanthanide and palladium oxide and platinum and/or ruthenium deposited on an alumina layer containing cerium. These catalytic systems also suffer from decreased chemical activation levels and decreased conversion efficiency over time.

It is known in the art to deposit a transition metal catalyst on a support or substrate. For example, U.S. Pat. No. 5,008,096 to Ringo discloses plating a transition metal on a support for the catalytic generation of chlorine dioxide. Examples of support materials which may be employed as an inert matrix for the Ringo et al. catalyst include polymeric materials (plastics), metals, aluminas, silicas, clays, ceramics, and the like. The supported promotion component may have any suitable shape or configuration, such as sheets, rods, extrudates, tablets, pills, irregular shaped particles, spheres, disks and the like. These systems generally take the form of small individual particles that collectively increase surface area. A drawback in such traditional catalytic systems is that the catalyst suffers from a high flow resistance and has no independent filtration capabilities, necessitating the addition of an actual filter.

Many substrates are known which are capable of holding a catalyst. Such substrates include activated carbon, alumina, activated alumina, barium carbonate, barium sulfate, calcium carbonate and various polymers, to name a few.

Most frequently the substrates are used in their powdered form and catalysts are deposited onto the powdered particles. While small individual particles may collectively have good surface area and may improve the catalytic capability of a given system, the disadvantages of these powder systems are manifest. Such systems bring with them the disadvantage of having a high flow resistance which dramatically lowers their effective filtration capabilities.

Flow resistance can be measured as a function of pressure differential across the device. An increased pressure differential will lead to an increased flow resistance and will result in a decrease in fluid flow. These problems associated with traditional powder systems are exemplified as follows.

In order to expose the catalyst to the reactive chemical species, the powders are traditionally entrapped in a filter mechanism. These powders tend to group tightly together restricting fluid flow and increasing the pressure differential through the entire system. Loose powders also have the possibility of being displaced to create non-catalytic channels.

Further, the chosen filter may cause problems of its own. It is important in a powdered catalytic system that the filtration capability of the mechanism be closely matched to the particle size distribution of the catalyst powder. Otherwise, grains of catalyst powder will pass through the filter and contaminate the fluid. For catalytic systems with submicron particles, the chosen filter must have even smaller pores to prevent the powder from passing through. A filter with such small pores would create resistance to the flowing fluid and would increase the pressure differential across the entire system.

Catalysts are also sometimes used in non-powderous forms, such as in the form of sheets, rods, disks, etc. However, these forms have the drawback of providing relatively low surface area and correspondingly relatively low amounts of available catalyst, and often require agitation of the reaction liquid to ensure intimate contact with the catalyst. The system complexity and cost are thus increased, while productivity may be decreased relative to powder systems.

All references cited in the specification, and their references, are incorporated by reference herein for teachings of additional or alternative details, features and/or technical background.

SUMMARY OF THE INVENTION

The present invention relates to a catalyst substrate and to a catalyst system comprising a Group VIII metal and/or Group VIII metal oxide deposited on a substrate which may preferably be coated with a hydrated metal oxide. The catalyst may additionally comprise a lanthanum compound or a lanthanide series compound on the substrate.

The present invention is directed to solving problems found in traditional transition metal catalytic systems. The invention creates a particular and unique microstructure with a unique surface area which contributes to maintaining constant conversion efficiency and high chemical activation levels. The catalyst system of the present invention resists the deactivation and performance reduction that traditional catalysts undergo.

The substrate comprises a chemically inert solid sintered agglomerate substrate which may provide a low pressure differential. The agglomerate may be formed by low pressure liquid phase sintering of particles to form a porous body with a large internal surface area. The internal surface of the substrate may be chemically tailored to increase surface area while maintaining the low pressure differential. This agglomerate requires no filtration to trap loose particles, and in fact may function effectively itself as a filter. It avoids the possibility that loose catalyst particulates could contaminate the fluid and avoids any possible mechanism for loose powder to be displaced and create non-catalytic channels.

The substrate can provide a large catalytic surface area, an increased effective filtration capability and a high degree of mechanical integrity while maintaining its ability to be molded into a variety of shapes suitable for a variety of uses.

BRIEF DESCRIPTION OF DRAWINGS

FIG. 1 shows a plot of catalytic activity over time for a catalyst system of the present invention.

DESCRIPTION OF PREFERRED EMBODIMENTS

The support of the present invention comprises a porous substrate which may preferably be coated with a hydrated metal oxide. Ceramic, polymer and metal substrates may be used according to the present invention. Of particular preference are alumina, carbon, carbon-containing compounds, barium carbonate, barium sulfate, calcium carbonate, polyethylene, polypropylene, ethylenevinyl acetate and styrene-acrylonitrile. Preferred supports include liquid phase sintered ceramics, sintered polymers and sintered metals. An especially preferred support in a liquid phase sintered alumina substrate.

The substrate is not restricted to any particular shape and may be made in a variety of shapes to accommodate many different applications. Such useful configurations include bars, balls, chains, mesh, plates, pellets, saddles, sheets, tubes, wires, ribbons, chopped wire, wire mesh, expanded sheets or the like. A typical but not exclusive configuration design is to have a disk shaped substrate which may be housed in a dispensing bottle of a reactive chemical species.

The substrate is formed to have a highly porous structure with an internal volume defining a large surface area on which catalyst can be deposited. In a highly desirable embodiment, particles are bonded together to form the agglomerate substrate, leaving interstices between the bonded particles which provide porosity to the agglomerate. For example, particles of an inert material may be point bonded together by liquid phase sintering. By appropriate selection of particle sizes and appropriate materials and process conditions, which selection could readily be accomplished by one of ordinary skill in the art who has read the present specification, the desired degree of porosity, effective filtration capacity and internal surface area can be achieved to fit the particular process for which the catalyst system is desired to be used.

For example, average particle diameters in the range of 0.003–0.012 inch may preferably be selected. Following liquid phase sintering as described herein, this can provide effective filtration capacity of 5–100 micrometers. "Effective filtration capacity" as used herein means that particles with a diameter larger than the stated value cannot pass through — for instance, an effective filtration capacity of 5 micrometers for a system means that particles with a diameter larger than 5 micrometers cannot pass through the system.

Using alumina as an example, the substrate may be formed as follows. Powdered alumina is mixed with a composition containing silicates and optional organic compounds. For example, the silicate composition may contain about 2 weight percent silicate in an organic solvent. The mixture is pressed at low pressure, for example 1 to 10 PSI, preferably 2-3 PSI, to form a desired shape. This shaped mixture may be heated to form a highly porous agglomerate substrate. In this step, any organic materials may be burned off and the silicates migrate to the points of contact of the alumina particles. The alumina particles are joined via the silicates. The resulting structure is an intricate lattice with high porosity and large internal surface area. This can be contrasted with traditional sintered alumina bodies which constitute a low surface area solid mass of low or no porosity.

Depending on the desired flow rate, porosity can be controlled by selecting appropriately sized alumina particles. For example, the larger the alumina particles, the greater the resulting porosity. Porosity can further be controlled by regulating pressure and firing temperature of the liquid phase sintering process.

The substrate is preferably coated with a hydrated metal oxide. A preferred hydrated metal oxide is hydrated aluminum oxide.

After sintering the substrate may be coated with a hydrated metal oxide which is absorbed into the substrate, preferably in the form of an aqueous suspension or a gel, preferably in a concentration of 50 to 350 g/L. The substrate may be coated using a gel dehydration process. The substrate is then dried, and the hydrated metal oxide coats the internal surface area of the substrate. This can substantially roughen the internal surface, further increasing the internal surface area.

The dried substrate internally coated with hydrated metal oxide may then be heated to sinter the hydrated metal oxide coating in place on the internal surface. This is preferably carried out in a relatively low temperature furnace, with the temperature selected as a function of the materials of the agglomerate and the selected hydrated metal oxide. For example, with a sintered alumina substrated internally coated with hydrated aluminum oxide, the temperature of the oven is preferably 400° to 900° C., more preferably about 700° C. The hydrated aluminum oxide generally contains sufficient silicate content for heating at such temperatures to produce liquid phase sintering which tightly bonds the rough hydrated aluminum oxide coating onto the internal surface of the sintered agglomerate, thereby substantially increasing surface area.

At least one Group VIII metal and/or Group VIII metal oxide may be provided on a substrate of the invention. A lanthanide compound may optionally be codeposited on the substrate. These compositions have been found very useful in the catalytic generation of chlorine dioxide. It has been found that electroless deposition of the metals and/or metal oxides yields very beneficial results. Of the Group VIII metals to be used in the present invention, the following examples may be cited in particular: iron, cobalt, nickel, ruthenium, rhodium, palladium, osmium, iridium and platinum. Preferred Group VIII metals include palladium, platinum, and rhodium, and most preferred is palladium. Of the Group VIII metal oxides to be used in the present invention, oxides of iron, cobalt, nickel, ruthenium, rhodium, palladium, osmium, iridium and platinum may be used. Among the most preferred Group VIII metal oxides, palladium oxide may be cited in particular.

Of the lanthanum compounds or lanthanide series compounds, also referred to as rare earth metals, to be used in the present invention, of particular importance are lanthanide oxides. Of the preferred lanthanum compounds or lanthanide oxides, the following may be cited in particular: lanthanum oxide, neodymium oxide, cerium oxide and praseodymium oxide.

By controlling the deposition of the metal and/or the oxidation of the metal to obtain a metal oxide, the overall characteristics of the catalyst, including conversion efficiency and ramp up time, can be controlled. For example, the thickness of the metal deposit can be controlled by the rate of deposition which is a function of temperature and pH of the deposition chemistry. The oxidation may be controlled by oxidation temperature, time and the gas makeup in the oven.

The catalyst system may be prepared by first reducing the Group VIII metal salts to metals on the substrate and then optionally decomposing at least part of these metals to metal oxides. Controlling and modifying such variables as time, pH, temperature and atmosphere will depend on the desired performance criteria. For example, specific control of these parameters will allow optimization of the conversion efficiency of the catalyst.

A surprising result of the present invention is the production of a highly efficient catalyst coated substrate which is chemically resistant to degradation when subjected to reactive chemical species over long periods of time. Orthogonal array testing of this system relative to competitive catalyst powders manufactured by, for example, Pfizer Corporation and Degussa Corporation and others, shows significant improvement in catalyst longevity in chemically aggressive and reactive environments. Daily test data of the catalytic activity of the present invention shows no measurable decrease after 5 months. FIG. 1 shows a plot of catalytic activity over time. By contrast, competitive systems in similar reactive environments may lose 20-50% of their activity in 30 days.

To the very limited extent that the present catalytic system may lose effectiveness over prolonged or continuous use, the system may be recycled by depositing a subsequent catalytic coating on the substrate.

Example 1

Powdered alumina having an average particle diameter of 0.009 inch is mixed with a composition containing silicates and various organic compounds traditionally used in the industry as a green state binder in firing. This mixture is pressed at 2-3 PSI to form disk-shaped substrates. The disks are placed in an oven and heated at a temperature of approximately 1000° C. After cooling, an aqueous suspension of hydrated alumina (50 to 350 g/L) and silicates is applied to and absorbed by the disks. The disks are then dried at approximately 700° C.

Example 2

The ceramic disks of Example 1 are loaded into a plating tank and conditioned for 10 minutes using a 5% solution of commercially available acidic cleaner (Coppermerse 1122 conditioner) in water. The disks are pre-dipped for 5 minutes in 180 g/L $NaCl_{(aq)}$ before catalysis for 10 minutes with a 2.5% solution of aqueous tin/palladium colloid containing approximately 1% Pd(II) and 25% Sn(II) (Coppermerse catalyst) in 180 g/L $NaCl_{(aq)}$. The disks are rinsed with water and accelerated for 2 minutes using a 5% solution of aqueous fluoroboric acid (Coppermerse accelerator). The disks are rinsed, removed from the fixture and dried at 55° C. for 1 hour. The dried parts will absorb the plating solution more evenly.

Next, the ceramic disks are loaded into the plating apparatus. The plating solution, 0.7 g/L Pd aqueous solution (1.7% Technics P-90 Pd Concentrate), and reducer, 8.3% of a commercially available reducer containing a borane amine complex (Technics P-90 Pd reducer), are added. The parts are plated for about 45 minutes before rinsing with water. The parts are then removed from the fixture and heated for 24 hours at 100° C. in air.

A catalyst comprising palladium and palladium oxide on a ceramic substrate coated with hydrated aluminum oxide is produced.

Example 3

Parts are plated as in Example 2 but are not heated at 100° C. for 24 hours. Instead, the parts are dried at 55° C. for 1 hour. A solution is made of $Pd(NO_3)_2$ and $La(NO_3)_3$ having 2.5 mg total combined PdO and $La_2O_3$ for each part after thermal decomposition, with 1.38 mg from PdO. The atomic ratio for each part after decomposition is Pd/La 1.5. The volume of solution is no more than 0.4 mL per part.

The solution is carefully pipetted onto each part and the parts are allowed to air dry. The parts are placed in a firing oven and fired to 600° C. with an $O_2$ concentration not exceeding 100 ppm. The parts are cooled by flushing with nitrogen.

A catalyst comprising palladium, palladium oxide and a lanthanide oxide on a ceramic substrate coated with hydrated aluminum oxide is produced.

What is claimed is:

1. A catalyst system, comprising a porous sintered alumina and silicate agglomerate catalyst substrate having alumina particles joined to other alumina particles via point bonding silicates, said catalyst system produced by compressing a particulate material at low pressure, adding silicates and organic materials and heating at a temperature not exceeding 900° C. to burn off said organic materials and cause said silicates to migrate to points of contact of said alumina particles, and at least one member selected from the group consisting of Group VIII metals and Group VIII metal oxides deposited on internal surfaces of said substrate sintered prior to depositing said member.

2. Catalyst system according to claim 1, wherein said first member is a mixture of a metal and an oxide of said metal.

3. Catalyst system according to claim 2, wherein said metal is palladium.

4. Catalyst system according to claim 1, further comprising a coating of hydrated metal oxide between said internal surfaces and said first member.

5. Catalyst system according to claim 1, wherein said substrate is a ceramic substrate.

6. Catalyst system according to claim 5, wherein said porous substrate is formed by liquid phase sintering of particles.

7. Catalyst system according to claim 1, wherein said substrate is composed of a material selected from the group consisting of alumina, carbon, barium carbonate, barium sulfate and calcium carbonate.

8. Catalyst system according to claim 1, wherein said substrate is composed of a carbon containing compound.

9. Catalyst system according to claim 5, wherein prior to being sintered said substrate is a polymer.

10. Catalyst system according to claim 9, wherein said polymer substrate is composed of a material selected from the group consisting of polyethylene, polypropylene, ethylene-vinyl acetate and styrene-acrylonitrileo 11. Catalyst system according to claim 4, wherein said hydrated metal oxide is hydrated aluminum oxide.

12. Catalyst system according to claim 1, further comprising at least one second member selected from the group consisting of lanthanum compounds and lanthanide series compounds codeposited on said support.

13. Catalyst system according to claim 12, wherein said second member is a lanthanide oxide.

14. Catalyst system according to claim 13, wherein said member is selected from the group consisting of lanthanum oxide, neodymium oxide, cerium oxide and praseodymium oxide.

15. Catalyst system according to claim 1 comprising at least one first member selected from the group consisting of Group VIII metals and Group VIII metal oxides deposited on internal surfaces of said substrate, comprising said porous agglomerate sintered prior to depositing said first member and having internal surfaces coated with hydrated metal oxide.

16. A catalyst system according to claim 15, wherein said substrate is a ceramic substrate.

17. A catalyst system according to claim 15, wherein said porous system is formed by liquid phase sintering of particles.

18. A catalyst system according to claim 17, wherein said particles are alumina particles and said hydrated metal oxide is hydrated aluminum oxide.

19. A method of making a catalyst system, comprising compressing an alumina particulate material at low pressure, adding a silicate and heating said material and said silicate at a temperature not exceeding 900° C. to produce a porous sintered agglomerate catalyst substrate, and depositing at least one first member selected from the group consisting of Group VIII metals and Group VIII metal oxides on internal surfaces of said substrate.

20. A method according to claim 19, wherein said agglomerate is coated with a hydrated metal oxide between said internal surfaces of said first member.

21. A method according to claim 19, wherein said first member is deposited by electroless deposition.

22. A method according to claim 19, wherein said first member is a mixture of a metal and an oxide of said metal.

23. A method according to claim 22, wherein said metal is palladium.

24. A method according to claim 19, wherein said porous substrate is formed by liquid phase sintering of particles.

25. A method according to claim 19, wherein said substrate is a ceramic substrate.

26. A method according to claim 19, wherein prior to being sintered said substrate comprises a polymer.

27. A method according to claim 25, wherein said ceramic substrate is composed of a material selected from the group consisting of alumina, carbon, barium carbonate, barium sulfate and calcium carbonate.

28. A method according to claim 26, wherein said polymer Substrate is composed of a material selected from the group consisting of polyethylene, polypropylene, ethylene-vinyl acetate and styrene-acrylonitrile.

29. A method according to claim 19, wherein said hydrated metal oxide is hydrated aluminum oxide.

30. A method according to claim 20, further comprising codepositing at least one second member selected from the group consisting of lanthanum compounds and lanthanide series compounds on said internal surfaces.

31. A method according to claim 30, wherein said second member is a lanthanide oxide.

32. A method according to claim 30, wherein said second member is selected from the group consisting of lanthanum oxide, neodymium oxide, cerium oxide and praseodymium oxide.

33. A method according to claim 30, wherein said second member is deposited by electroless deposition.

* * * * *